United States Patent
Belling

(10) Patent No.: US 8,089,867 B2
(45) Date of Patent: Jan. 3, 2012

(54) METHOD FOR ALLOCATING AT LEAST ONE USER DATA LINK TO AT LEAST ONE MULTIPLEX CONNECTION

(75) Inventor: Thomas Belling, Erding (DE)

(73) Assignee: Siemens Aktiengesellschaft, Munich (DE)

( * ) Notice: Subject to any disclaimer, the term of this patent is extended or adjusted under 35 U.S.C. 154(b) by 663 days.

(21) Appl. No.: 12/162,281

(22) PCT Filed: Jan. 24, 2007

(86) PCT No.: PCT/EP2007/050674

§ 371 (c)(1),
(2), (4) Date: Jul. 25, 2008

(87) PCT Pub. No.: WO2007/085606

PCT Pub. Date: Aug. 2, 2007

(65) Prior Publication Data

US 2009/0010217 A1    Jan. 8, 2009

(30) Foreign Application Priority Data

Jan. 27, 2006    (EP) .................................. 06001745

(51) Int. Cl.
   H04L 12/26    (2006.01)
(52) U.S. Cl. .................. 370/229; 370/252; 370/401
(58) Field of Classification Search .......... 370/229–335, 370/392, 252, 253, 401
See application file for complete search history.

(56) References Cited

U.S. PATENT DOCUMENTS

2007/0053361 A1 *  3/2007  Chen et al. .............. 370/392
2008/0240375 A1 * 10/2008  Chen .............................. 379/87

FOREIGN PATENT DOCUMENTS

| JP | 2002-538727 U | 11/2002 |
| JP | 2003-500907 U | 1/2003 |
| JP | 2005-503074 | 1/2006 |
| WO | 00/52884 | 9/2000 |
| WO | 00/70885 | 11/2000 |
| WO | 03/024052 A1 | 3/2003 |

OTHER PUBLICATIONS

Tanigawa T, et al., "Simple RTP Multiplexing Transfer Methods for VoIP", 19981118, Nr. 1, Nov. 18, 1998. "BICC IP Bearer Control Protocol", *International Telecommunication Union*, ITU-T Recommendation Q.1970, Jul. 2001 (whole document).
3GPP: "Core Network Nb data transport and transport signaling", *3GPP TS 29.414 V7.0.0* (Dec. 2005), Technical Specification, Dec. 2005, pp. 1-15.
International Search Report mailed on Jun. 28, 2007 in connection with International Application No. PCT/EP2007/050674.

* cited by examiner

*Primary Examiner* — Gary Mui
(74) *Attorney, Agent, or Firm* — Staas & Halsey LLP

(57) ABSTRACT

The invention relates to a method for allocating at least one user data link to a multiplex connection provided between a first network element and a second network element. According to the method, the first network element generates a first signaling message and transmits the same to the second network element, the first signaling message indicating to the second network element that the first network element is available to transfer the at least one respective user data link via one respective multiplex connection. The second network element assigns one multiplex connection between the first network element and the second network element to each of the at least one user data link or selects a transfer outside a multiplex connection for the user data link in accordance with the indicated availability of the first network element and depending on whether the second network element supports the transfer of the at least one user data link via multiplex connection. The possibility of allocating the at least one user a data link to a multiplex connection is indicated to the first network element by a second signaling message that is generated in the second network element and is transmitted to the first network element.

19 Claims, 4 Drawing Sheets

FIG 2

| Bits | | | | | | | | Number of Octets | |
|---|---|---|---|---|---|---|---|---|---|
| 7 | 6 | 5 | 4 | 3 | 2 | 1 | 0 | | |
| Source IP, Dest IP, ... | | | | | | | | 20/40 | IP |
| Source Port, Dest Port, Length, ... | | | | | | | | 8 | UDP |
| Timestamp, Payload type, CSRC, SSRC, ... | | | | | | | | 16 | RTP |
| ID1 | | | | | | | | 3 | MP1 |
| Length | | | | | | | | | |
| Time Offset | | | | | | | | | |
| Frame Number, Payload, ... | | | | | | | | e.g. 35 | IuFP1 |
| ID 2 ... | | | | | | | | 3 | MP2 |
| | | | | | | | | e.g. 35 | IuFP2 |
| ID 3 ... | | | | | | | | 3 | MP3 |
| | | | | | | | | e.g. 35 | IiFP3 |

DP brackets all rows. UC1 brackets MP1 and IuFP1. UC2 brackets MP2 and IuFP2. UC3 brackets MP3 and IiFP3.

FIG 3

| Bits | | | | | | | | Number of Octets | |
|---|---|---|---|---|---|---|---|---|---|
| 7 | 6 | 5 | 4 | 3 | 2 | 1 | 0 | | |
| Source IP, Dest IP, ... | | | | | | | | 20/40 | IP |
| Source Port, Dest Port, Length, ... | | | | | | | | 8 | UDP |
| Timestamp, Payload type, CSRC, SSRC, ... | | | | | | | | 16 | RTP |
| ID1 | | | | | | | | 3 | MP1 |
| Length | | | | | | | | | |
| Time Offset | | | | | | | | | |
| Timestamp, Payload type, CSRC, SSRC, ... | | | | | | | | 16 | RTP1 |
| RTP Payload | | | | | | | | e.g. 33 | e.g. AMR |
| ID 2 ... | | | | | | | | 3 | MP2 |
| Timestamp, Payload type, CSRC, SSRC, ... | | | | | | | | 16 | RTP2 |
| RTP Payload | | | | | | | | e.g. 33 | e.g. AMR |
| ID 3 ... | | | | | | | | 3 | MP3 |
| RTP control information | | | | | | | | e.g. 64 | RTCP |

DP { ... }  
UC1, UC2, UC3

METHOD FOR ALLOCATING AT LEAST ONE USER DATA LINK TO AT LEAST ONE MULTIPLEX CONNECTION

CROSS REFERENCE TO RELATED APPLICATIONS

This application is based on and hereby claims priority to International Application No. PCT/EP2007/050674 filed on Jan. 24, 2007, and German Application No. 06001745.6, filed on Jan. 27, 2006, the contents of both of which are herein incorporated by reference.

BACKGROUND

The embodiments discussed herein relate to a method for allocating at least one payload data connection to at least one multiplex connection which is provided between a first network element and a second network element.

For the purpose of transmitting voice data via a mobile communication system or mobile radio system, use is increasingly being made of packet-oriented data transmission methods in which, depending on the transmission protocol that is used in each case, data fields having different sizes are provided for transmitting the compressed voice data. Transmission protocols that are generally used include "Layer 2" transmission protocols such as e.g. the Ethernet protocol, as well as the Internet Protocol (IP), the "User Datagram Protocol" (UDP) (RFC 768), the "Realtime Transport Protocol" (RTP) (RFC 3550), and in many cases also the "Iu Framing Protocol" (IuFP) (3GPP TS 29.415).

For example, in the so-called CS domain of the "Core Network" of a third-generation mobile radio system (3GPP), a so-called "Nb" data connection is established for data transmission e.g. between a so-called Media Gateway unit (MGW) and/or a "Mobile Switching Center" (MSC). The voice or multimedia data to be transmitted is compressed, e.g. by an "Adaptive Multi-Rate" (AMR) voice encoding unit, and the compressed voice data is then transmitted via the "Iu Framing Protocol" (IuFP) (3GPP TS 29.415) or the RTP, UDP or IP protocol (cf. standard 3GPP TS 29.414).

The data fields of the relevant transmission protocols, i.e. the relevant "headers", are together often significantly larger than the data, e.g. compressed voice data, which is transmitted therein. For example, the data field of an IP packet has a size of 20 bytes (IP Version 4.0) or 40 bytes (IP Version 6.0). The data fields of the UDP protocol have a size of 8 bytes, whereas the data fields of the RTP protocol comprise 16 bytes and those of the IuFP protocol comprise 4 bytes. By contrast, the data which is compressed by the AMR voice encoding unit has a size of 35 bytes in the "12.2 kHz" mode or a size of 5 bytes in the "Silence Indication" (SID) mode which is used between voice pauses.

A plurality of payload data connections, e.g. telephone connections, are usually transmitted concurrently between at least two Mobile Switching Centers or two Media Gateway units, e.g. in accordance with the standard for the so-called NB interface. In the same manner as the Nb interface, the data transmission can take place via the "Iu" interface which is likewise provided in a 3GPP mobile radio system and exists between a Media Gateway unit or a Mobile Switching Center and a so-called "Radio Network Controller" (RNC) unit (cf. 3GPP TS 25.414 and 25.415).

The currently existing standards provide for an individual physically separate data connection, this being realized in accordance with the relevant transmission protocol for an IP/UDP/RTP data connection, to be established via the Nb or Iu interface for each payload data connection that is to be transmitted, e.g. for a telephone call, and for the data packets, these being constructed in accordance with the relevant IP, UDP and RTP transmission protocol, to be transmitted via the data connection.

In the context of both the Nb interface and the Iu interface, the IP, UDP and RTP protocol is terminated in each case at the delimiting Media Gateway unit and the delimiting Mobile Switching Center or the delimiting RNC, i.e. the data fields of the individual data packets that are transmitted via the Nb or Iu data connection correspond to some extent at least and are read out and further processed in the cited units following the transmission. By contrast, the data fields of data packets that are realized in accordance with the IuFP protocol are routed through the relevant Media Gateway unit or Mobile Switching Center unchanged.

Furthermore, a multiplicity of multiplexing technologies, via which data of a plurality of payload data connections is transmitted almost simultaneously by a multiplexed data connection, are known in the field of transmission technology. Such data connections, being provided for the purpose of transmitting a plurality of payload data connections or telephone connections, are subsequently designated as multiplexed connections.

At the Nb or Iu interface, data of a plurality of payload data connections is advantageously transmitted together within a multiplexed connection which is preferably transported by the IP/UDP/RTP protocols. Data of a plurality of payload data connections, preferably with individual IuFP header and individual payload data such as e.g. compressed voice data in each case, could thus be contained in one IP packet which contains in each case only one IP, UDP and RTP header. As a result, the required bandwidth for the transport could be significantly reduced. This possibility is not yet described in the standard, however.

For the purpose of establishing a payload data connection via an Nb data connection, provision is made for the so-called "BICC IP Bearer Control Protocol" (IPBCP) (ITU-T Q.1970), which itself uses the so-called "Session Description Protocol" (SDP) (IETF RFC 2327) (cf. 3GPP TS 29.414). For the purpose of establishing a payload data connection between a first and second Media Gateway unit, the IPBCP protocol provides for the transmission of an "IPBCP Request Message" from the first to the second Media Gateway unit. This message is answered by the second Media Gateway unit by an "IPBCP Response Message". Using the cited IPBCP messages, the first and second Media Gateway units exchange their respective IP addresses and UDP port numbers, knowledge of which is required for the exchange of data between the first and second Media Gateway units. The IPBCP messages are transmitted transparently by the so-called BICC signaling protocol (ITU-T Q.1902.1-5).

SUMMARY

The embodiments address the problem of specifying a method for allocating at least one payload data connection to a multiplexed connection which is provided between at least one first network element and at least one second network element, where the transmission bandwidth that is required for transmitting the payload data, e.g. voice data, is significantly reduced.

The essential point of the method can be considered to be that a first signaling message is generated by the first network element and transmitted to the second network element, wherein the readiness of the first network element to transport the at least one payload data connection via a multiplexed connection in each case is indicated to the second network element by the first signaling message. Depending on the indicated readiness of the first network element and on whether the transport of the at least one payload data connection via a multiplexed connection is supported by the second network element, the second network element either allocates each of the at least one payload data connections in each case to a multiplexed connection between the first network element and the second network element or selects a transport outside of a multiplexed connection for this payload data connection. Using a second signaling message which is generated in the second network element and transmitted to the first network element, the possible allocation of the at least one payload data connection to a multiplexed connection is indicated to the first network element. Using the method, it is advantageously not necessary for the first network element, which initiates the allocation, to know the destination nodes of the payload data connection. It is therefore possible for the standardized IPBCP protocol, in which the IPBCP Request Message that is transmitted by a first network element is generally sent without knowledge of the second network element which will receive this message, or the likewise standardized SIP signaling protocol to be expanded such that it includes the method. As a result of establishing the relevant payload data connection via a multiplexed connection, it is possible to transmit in particular compressed voice data using a significantly reduced bandwidth.

The method is also advantageous in that it is not necessary to introduce new messages in the IPBCP protocol, but merely to expand the existing messages in a suitable manner.

It is further advantageous that the method optionally allows the transport of a payload data connection between a first network element which supports the transport of data via a multiplexed connection, and a second network element which only supports the transport of payload data connections outside of multiplexed connections in accordance with existing standards.

When selecting the multiplexed connection, the second network element preferably considers whether sufficient free resources for the new payload data connection are present in the multiplexed connection, e.g. free address information for the payload data connection.

If the IPBCP protocol is used, a so-called IPBCP Request Message and an IPBCP Response Message are exchanged separately when establishing each payload data connection. In the IPBCP Request Message, the first network element specifies its IP address and a UDP port number in accordance with the existing standard. In order to indicate that the transport of a payload data connection over a multiplexed connection is desired, a newly developed SDP attribute is introduced. Alternatively, a new "MIME" parameter is used for the MIME Type of the IuFP protocol as defined in TS 29.414.

If the second network element does not support the transport of payload data connections via multiplexed connections, the second network element ignores the new unrecognized SDP attribute or the new MIME parameter, in accordance with the existing SDP standard, and sets up an individually transported payload data connection to the specified IP address and port number in accordance with the existing IPBCP standard. The necessary backwards-compatibility is therefore established.

If the second network element supports the transport of payload data connections via multiplexed connections, but decides not to utilize multiplexing for the specified payload data connection, the second network element sends an IPBCP Response Message in accordance with the existing standard in the same way and without expansions that are specified in the embodiments.

When a second network element which supports multiplexing receives the IPBCP Request Message specifying that multiplexing is desired, it selects a multiplexed connection to the IP address specified in the IPBCP Request Message. Alternatively, the multiplexed connection can also go to a port other than the port specified in the IPBCP Request Message.

In the IPBCP Response Message, the second network element notifies the first network element that multiplexing has been selected and specifies the selected multiplexed connection, preferably by the UDP port number, which the second network element uses for receiving the multiplexed connection. A new SDP attribute can be used for the purpose of specifying that multiplexing is selected, e.g. the same new SDP attribute that is used in the IPBCP Request Message for specifying that multiplexing is desired. Alternatively, a new "MIME" parameter for the MIME Type of the IuFP as defined in TS 29.414 is used for specifying that multiplexing is selected, e.g. the same new parameter that is used in the IPBCP Request Message. The specification of the port number which is used for receiving the multiplexed connection in MGW-B can be done within the so-called SDP "Media" line which describes the payload data connection, or using a new SDP attribute or MIME Type parameter.

Furthermore, the method advantageously allows the assignment of a unique identification code to the payload data connection within the multiplexed connection. This identification code can be specified e.g. within the data packets of the multiplexed connection, being allocated in each case to a transported data packet of the payload data connection, in order thus to indicate the payload data connection to which the transported data packet belongs.

After a multiplexed connection has been selected, the second network element preferably assigns a further identification code, which is unique within the multiplexed connection, to the payload data connection which has been newly allocated to this multiplexed connection, and notifies the first network element of the selected further identification code for each newly allocated payload data connection, using the message in which the second network element indicates whether and to which multiplexed connection each payload data connection is allocated.

This identification code can then be specified e.g. within the data packets of the multiplexed connection, being allocated in each case to a transported data packet of the payload data connection, in order thus to indicate the payload data connection to which the transported data packet belongs. For a payload data connection in this context, the same identification code is preferably used for data packets which are sent from the first network element to the second network element as for data packets which are sent from the second network element to the first network element.

For SDP, which is used in the case of IPBCP, the specification of the identification code preferably takes place by a new SDP attribute or MIME Type parameter, e.g. by the attribute or parameter which indicates that multiplexing is used.

As soon as a payload data connection is terminated, the identification code which was previously used for this payload data connection is preferably assigned to another payload data connection that has been newly allocated to the multiplexed connection. In order to prevent the same identification code from being inadvertently assigned to different new payload data connections within the same multiplexed connection simultaneously by the first and second network element, it is advantageous if the first and second network element are allotted different value ranges for determining the identification code. For example, the network element which first assigns a payload data connection to a new multiplexed connection can thereby be allotted the lower value range, while the other network element, which receives a message from the network element relating to the allocation of the payload data connection, is allotted the upper value range by this message.

In addition, the method advantageously supports the setting up of new multiplexed connections, in particular if no suitable multiplexed connection is yet available for the payload data connection. Such an automatic and dynamic setting up of multiplexed connections simplifies the operation of a communication system considerably.

When the message containing an address and indicating that the allocation of payload data connection(s) to one or more multiplexed connection(s) is desired is received from the first network element, in the event that no suitable multiplexed connections to the specified address are yet available or that no more resources are available on the existing payload data connections, it is correspondingly advantageous for the second network element to establish a new multiplexed connection to the specified address and assign this new multiplexed connection to the payload data connections.

Establishing the new multiplexed connection is preferably done by the second network element designating a multiplexed connection which was not previously available, e.g. by a previously unused UDP port number of the second network element, in the message to the first network element. When the message from the second network element is received, as a result of new address information being used, the first network element recognizes that a new multiplexed connection is being used. The first network element preferably first specifies a free UDP port number in the message to the second network element, and the second network element uses this UDP port number in order to send data to the first network element in a newly established multiplexed connection. If the second network element selects an already existing multiplexed connection, however, the second network element uses a different port number of the first network element, which port number was already allocated to this multiplexed connection previously. A multiplexed connection is preferably closed as soon as the last payload data connection which is transported therein is terminated.

The embodiments are also suitable for other networks which provide the so-called "Session Initiation Protocol" (IETF RFC 3261) for the purpose of signaling and in which a large amount of payload data connections are exchanged between the same network elements, e.g. the so-called "Internet Multimedia Subsystem" (IMS), in the manner that has been standardized by ETSI TISPAN. For the purpose of describing the payload data connections, use is also made here of the SDP protocol which is exchanged in accordance with the so-called "SDP-Offer-Answer" mechanism (IETF RFC 3264) by a so-called SDP Offer Message and a subsequent SDP Answer Message, these being comparable with the IPBCP Request Message and the IPBCP Response Message.

Further advantageous embodiments of the method are derived from the further patent claims.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 2 shows the structure of a data packet of a multiplexed connection by way of example in a schematic illustration, FIG. 3 shows an alternative structure of a data packet of a multiplexed connection by way of example in a schematic illustration.

DETAILED DESCRIPTION OF THE PREFERRED EMBODIMENT

Figure 1:
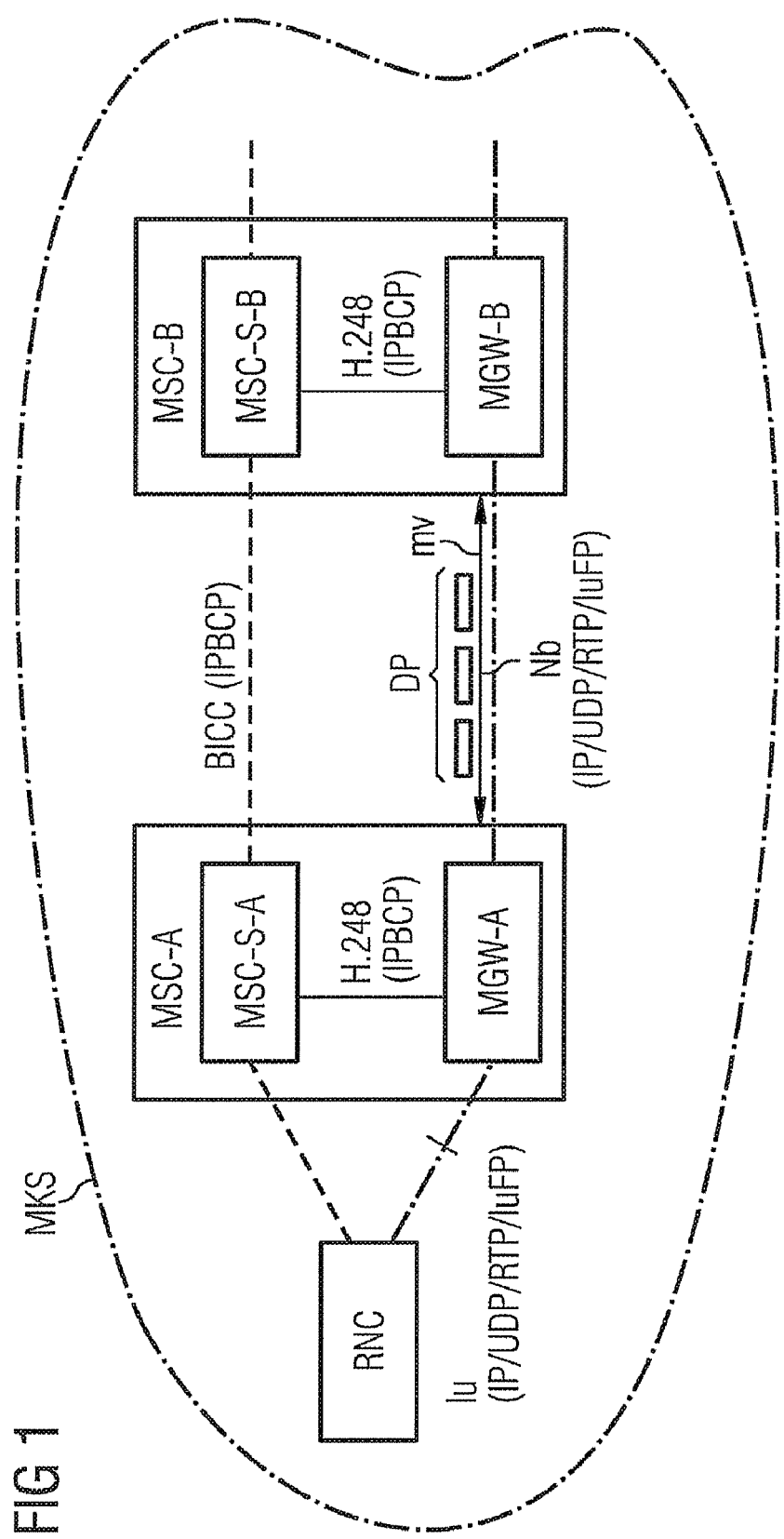
FIG. 1 shows the network components of a mobile communication network which interact for the purpose of executing the method by way of example in a schematic block diagram.

Reference will now be made in detail to the preferred embodiments, examples of which are illustrated in the accompanying drawings, wherein like reference numerals refer to like elements throughout.

By way of example in a schematic block diagram, FIG. 1 illustrates a first network element, in particular a network node MSC-A, and a second network element, in particular a network node MSC-B, of a mobile communication system MKS, wherein the first and second network nodes MSC-A, MSC-A are designed as mobile switching centers in a preferred embodiment.

The first network node MSC-A features a first MSC Server unit MSC-S-A and a first Media Gateway unit MGW-A by way of example in the exemplary embodiment illustrated in FIG. 1. In a similar manner, the second network node MSC-B features a second MSC Server unit MSC-S-B and a second Media Gateway unit MGW-B. The server and media gateway functionalities which are realized by separate units, and specifically by the first and second MSC Server unit MSC-S-A and the first and second Media Gateway unit MGW-A, MGW-B, can alternatively also be realized in a shared unit in each case.

In the present exemplary embodiment, the first and second network nodes MSC-A, MSC-B or their first and second Media Gateway units MGW-A, MGW-B are connected together via the one "Nb" interface, which uses the IP, UDP, RTP and IuFP protocol for transmitting data packets DP of a payload data connection that is to be established.

According to the embodiments, at least one multiplexed connection mv for transmitting at least one payload data connection is provided at the "Nb" interface. There also exists a BICC signaling connection between the first and second MCS Server Unit MSC-S-A, MSC-S-B, wherein the first and second MCS Server Unit MSC-S-A, MSC-S-B is connected via a signaling connection which is based on the ITU-T H.248 protocol to the first or second Media Gateway unit MGW-A, MGW-B respectively and controls it via this interface. The "BICC IP Bearer Control Protocol" (IPBCP) is supported by both the BICC signaling connection and the H.248 signaling connection.

The first network node MSC-A, or more precisely the first MSC Server unit MSC-S-A and the first Media Gateway unit MGW-A, is also connected to a "Radio Network Controller" (RNC) unit by the so-called "Iu" interface or an "Iu" data connection. The IP, UDP, RTP and IuFP protocol is also used by the Iu data connection for transmitting the data packets of a payload data connection.

FIG. 2 provides an exemplary illustration of the structure of a data packet DP of a multiplexed connection mv as per the embodiments, the connection being transmitted e.g. via the Nb data connection or Nb interface. The data packet DP is provided for the multiplexed data transmission of e.g. first to third payload data connections UC1, UC2, UC3.

To this end, the data packet DP features just one IP, UDP and RTP data field IP, UDP, RTP in each case, whereas the payload data of the first to third payload data connections UC1, UC2, UC3 is transmitted in a discretely arranged data field IuFP1 to IuFP3 in each case, which preferably contains data of the IuFP and the payload data of the first, second or third payload data connection UC1, UC2, UC3 in each case. The payload data can in each case be voice information which is encoded e.g. according to the AMR method.

For each payload data connection UC1 to UC3, a multiplexed data field MP1, MP2, MP3 is preferably also inserted in each case, the multiplexed data field containing at least a first to third identification code ID1, ID2, ID3 which designates the respective payload data connection UC1, UC2 or UC3 within the multiplexed connection, and possibly further information relating to the length of the payload data that is being transmitted in each case and/or a time stamp. Provision can also be made for a first to third IuFP data field IuFP1, IuFP2, IuFP3.

An IPBCP Request Message and IPBCP Response Message are described in greater detail below by way of example, the messages being encoded by the "Session Description Protocol" (SDP) and being exchanged e.g. between the first and second network nodes MSC-A, MSC-B illustrated in FIG. 1, in particular between the first and second Media Gateway units MGW-A, MGW-B.

IPBCP Request Message (MGW-A->MGW-B):
Rq1 c=IN IP4 host.anywhere.com
Rq2 m=audio 49170 RTP/AVP 97
Rq3 a=rtpmap:97 VND.3GPP.IUFP/16000
Rq4 a=fmtp:97 multiplex
IPBCP Response Message (MGW-B->MGW-A):
Rp1 c=IN IP4 host.example.com
Rp2 m=audio 49320 RTP/AVP 97
Rp3 a=rtpmap:97 VND.3GPP.IUFP/16000
Rp4 a=fmtp:97 multiplex; user_connection_id=11

The IPBCP Request Message is generated in the first Media Gateway unit MGW-A of the first network node MSC-A and transmitted to the second Media Gateway unit MGW-B of the second network node MGW-B. By the multiplexing identification code "multiplex" for the MIME Type of the IuFP protocol, this being specified in the fourth line Rq4 of the IPBCP Request Message, the first Media Gateway unit MGW-B notifies the second Media Gateway unit MGW-B that it wants the payload data connection which is specified in the IPBCP Request Message to be allocated to a multiplexed connection mv.

In the first line Rq1 of the IPBCP Request Message, the first Media Gateway unit MGW-A specifies address information which is allocated to it, e.g. its IP address such as "host.anywhere.com", to which the multiplexed connection is to be routed.

In the second line Rq2 of the IPBCP Request Message, the first Media Gateway unit MGW-A specifies a free port number in the first Media Gateway unit MGW-A, e.g. "49170", which port number can be used for establishing a multiplexed connection mv that does not yet exist at the time of the request, but can also be used for establishing a payload data connection outside of a multiplexed connection in accordance with the existing standard.

If no multiplexing identification code "multiplex" is provided in the fourth line Rq4 of the IPBCP Request Message, the specified IP address and port number are intended for establishing a simple (i.e. non-multiplexed) payload data connection in a standard-compliant manner. In the first Media Gateway unit MGW-A, it is already anticipated that the second Media Gateway unit MGW-B might not support or comply with the allocation preference that is indicated by the multiplexing identification code "multiplex", and might use the transmitted IP address and port number for establishing a simple non-multiplexed payload data connection to the first Media Gateway unit MGW-A.

Following receipt of the IPBCP Request Message, the second Media Gateway unit MGW-B allocates the port number of the desired multiplexed connection in the second Media Gateway unit MGW-B, e.g. the multiplexed connection having the port number "49320", to a multiplexed connection mv to the received IP address "host.anywhere.com".

In a preferred embodiment, the first and second Media Gateway unit MGW-B allocate an identification code within the allocated multiplexed connection mv (the identification code "11" in the present exemplary embodiment) to the payload data connection that must be established. In order to prevent the same identification code from being inadvertently assigned to different new payload data connections within the same multiplexed connection simultaneously by the first and second Media Gateway unit MGW-A, MGW-B, the first and second Media Gateway unit MGW-A, MGW-B are preferably allotted different value ranges for assigning the identification code. For example, the Media Gateway unit MGW-B which first assigns a payload data connection to a new multiplexed connection can thereby be allotted the lower value range, while the other Media Gateway unit MGW-A is allotted the upper value range.

If the second Media Gateway unit MGW-B finds that no multiplexed connection mv yet exists to the desired IP address "host.anywhere.com", it establishes a new multiplexed connection mv to the IP address "host.anywhere.com" and the specified port number "49170" in the first Media Gateway unit MGW-A by an IPBCP Response Message. In this case, the allocated port number "49320" is a previously unused port number in the second Media Gateway unit MGW-B.

If an existing multiplexed connection is selected, however, the allocated port number "49320" of the second Media Gateway unit MGW-B corresponds to the port number of the existing multiplexed connection mv, which has been assigned the port number "49170" in the first Media Gateway unit MGW-A.

The information for establishing the payload data connection, which information is determined by the second Media Gateway unit MGW-B, is notified to the first Media Gateway unit MGW-A by the IPBCP Response Message.

By the multiplexing identification code "multiplex" for the MIME Type of the IuFP protocol, for example, the identification code being specified in the fourth line Rp4 of the IPBCP Response Message, the first Media Gateway unit MGW-A is notified that the payload data connection described in the IPBCP Response Message has been allocated to a multiplexed connection. Using the additionally transferred parameter "user_connection_id" with the value "11", the first Media Gateway unit MGW-A is informed of the identification code that has been allocated to the payload data connection within the multiplexed connection mv by the second Media Gateway unit MGW-B.

The first line Rp1 of the IPBCP Response Message specifies the IP address, e.g. "host.example.com", which has been allocated by the second Media Gateway unit MGW-B and to which the multiplexed connection mv leads.

The second line Rp2 of the IPBCP Response Message specifies the port number "49170" which has been allocated by the second Media Gateway unit MGW-B and to which the multiplexed connection mv is routed in the second Media Gateway unit MGW-B. This therefore also indirectly designates the selected multiplexed connection mv. The second Media Gateway unit MGW-B can also induce the first Media Gateway unit MGW-A to establish a new multiplexed connection mv by specifying a previously unused port number.

A missing multiplexing identification code "multiplex" in the fourth line Rp4 of the IPBCP Response Message informs the first Media Gateway unit MGW-A that a multiplexed connection mv is not used for establishing the payload data connection, but that this is being established in accordance with the currently standardized method as a simple non-multiplexed payload data connection by the transmitted IP address and the associated port number. An IPBCP Response Message without multiplexing identification code "multiplex" would also be sent by a previously standardized Media Gateway unit MGW-2 which does not understand and therefore ignores the multiplexing identification code "multiplex" in the fourth line Rq4 of the IPBCP Request Message and only supports the transport of payload data connections outside of multiplexed connections.

Figure 4:
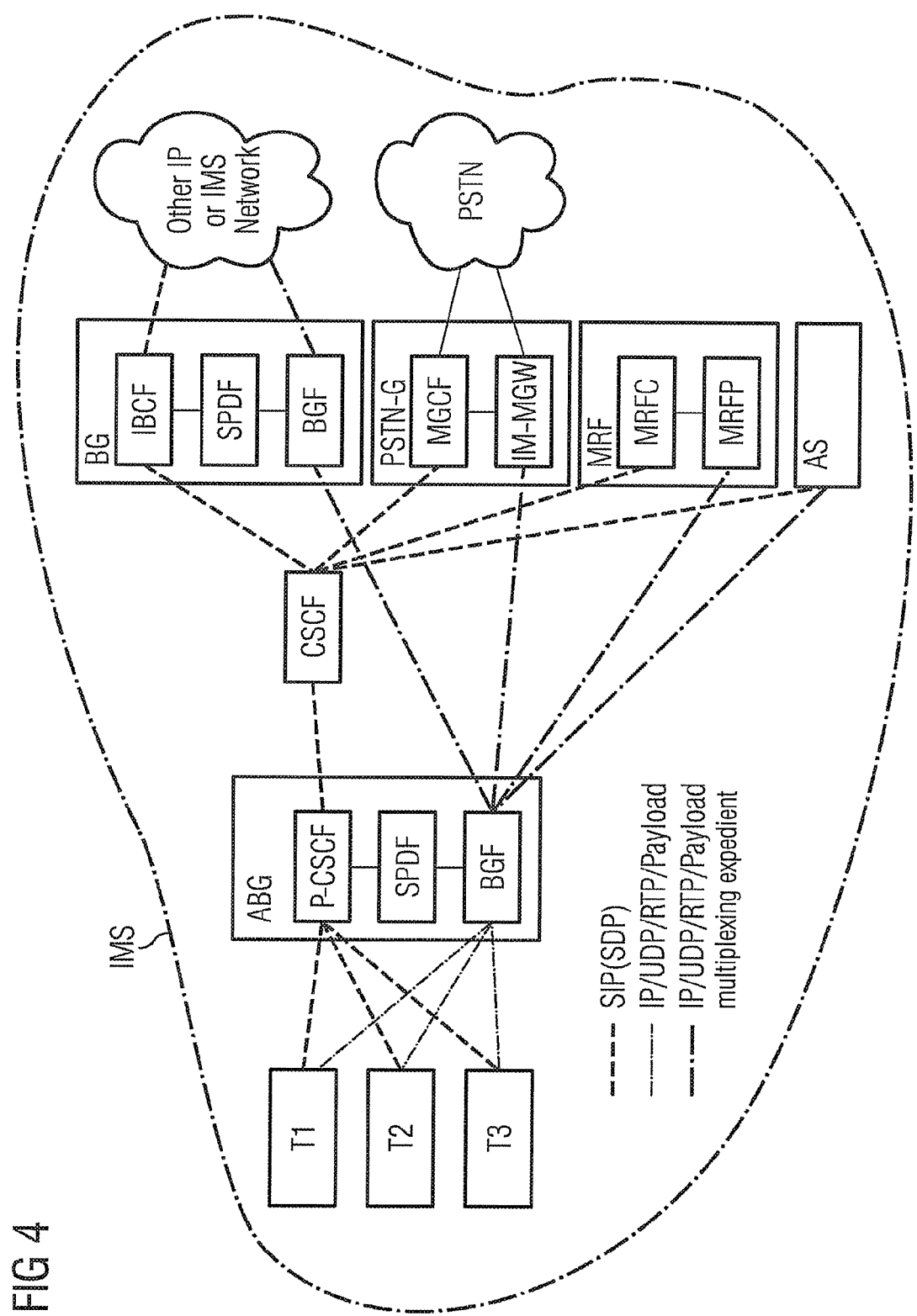
FIG. 4 shows the network architecture of an IMS-based communication system by way of example in a schematic block diagram.

For the purpose of explaining an alternative use case for the method, FIG. 4 provides a simplified illustration in a schematic block diagram of the network architecture of a communication system that is based on an "Internet Multimedia Subsystem" (IMS) or IMS communication system IMS which features expansions that have already been standardized by the standardization body "Telecoms & Internet converged Services & Protocols for Advanced Networks" (TISPAN) and protocols that are already in use.

The IMS communication system IMS features e.g. first to third communication terminals T1 to T3 which support the "Session Initiation Protocol" (SIP) SIP in each case. The first to third communication terminals T1 to T3 are connected via the SIP protocol SIP (SDP) to a so-called "Access Boarder Gateway" (ABG) unit ABG and thereby linked to the SIP core network.

According to the standard which is defined by TISPAN, the functions that are normally allocated to the ABG unit ABG are realized by a plurality of interconnected network elements, and specifically by a so-called "Proxy Call Session Control Function" (P-CSCF) unit P-CSCF, a "Service-based Policy Decision Function" (SPDF) unit SPDF and a "Boarder Gateway Function" (BGF) unit BGF. In this type of configuration, on the basis of the SIP signaling data, the P-CSCF unit P-CSCF controls the SPDF unit SPDF which in turn controls the BGF unit BGF.

In the IMS communication system IMS, provision can also be made for so-called "Application Server" (AS) units which offer selected applications such as a "Push-to-Talk" communication service, for example.

Provision can also be made for "Media Resource Functions" (MRF) units MRF, which serve as conference bridges and are made of two network elements, specifically a so-called MRF Controller (MRFC) unit MRFC and a so-called MRF Processor (MRFP) unit MRFP.

Furthermore, the IMS communication system IMS can be connected to other IP or IMS communication systems by a "Boarder Gateway" (BG) unit BG. For this purpose, the BG unit BG features an "Interconnection Boarder Control Function" (IBCF) unit IBCF, an SPDF unit SPDF and a BGF unit BGF.

The IMS communication system IMS can be connected to a "Public Switched Telephone Network" PSTN by a "PSTN Gateway" (PSTN-G) unit PSTN-G. For this purpose, the unit features a "Media Gateway Control Function" (MGCF) unit MGCF and an "Internet Multimedia Media Gateway" (IM-MGW) unit IM-MGW.

The SIP signaling is routed by a "Call Session Control Functions" (CSCF) unit CSCF in the IMS communication system IMS, wherein the first to third communication terminals T1 to T3 exchange signaling data via the P-CSCF unit P-CSCF, which in turn exchanges SIP signaling data via the CSCF unit CSCF, with the IBCF, MGCF, MRFC and AS unit IBCF, MGCF, MRFC, AS in each case, the signaling data being transmitted using the SDP protocol.

For the purpose of transporting payload data between the first to third communication terminals T1 to T3, the BGF unit BGF, the IM-MGW unit IM-MGW, the MRFP unit MRFP and the AS unit AS, these are interconnected by the RTP, UDP and IP protocols RTP, UDP, IP. In addition to the payload data, the "Real Time Control Protocol" (RTPC) which is standardized in RFC 3550 is also transmitted. Unlike the exemplary embodiment of the 3GPP CS domains as illustrated in FIG. 1, the IuFP protocol is not used in the IMS communication system IMS. However, it is also anticipated here that a multiplicity of payload data connections will be transmitted almost simultaneously between two network elements of the IMS core network (BGF, IM-MGW, MRFP or AS in each case), and therefore a wide bandwidth will be required. In order that bandwidth can be economized, it is appropriate to provide multiplexed connections for transmitting a plurality of payload data connections having similar attributes.

The structure of a data packet DP of a multiplexed connection mv is illustrated in FIG. 3 by way of example, and shows the possible format of a multiplexed data packet such as could be provided e.g. at the interfaces indicated in FIG. 4. The structure corresponds largely to the structure illustrated in FIG. 2. By contrast, however, the RTP data fields RTP1 and RTP2 which support the RTP protocol are provided instead of the IuFP data fields IuFP1 to IuFP3. This is required in particular due to the payload data connection which is realized as an end-to-end connection, in order to allow for a reconstruction of the payload data immediately in the encoding unit or decoding unit, e.g. in the relevant communication terminal T1 to T3.

In addition to the payload data connections which are transmitted in accordance with the RTP protocol, provision can also be made for allocated RTCP control connections in a data field of the multiplexed data packet DP. In a similar manner to the other payload data connection, an identification code ID3 is assigned to it for this purpose.

Furthermore, an RTP data field RTP is likewise provided in the header of the multiplexed data packet DP. Information relating to jitter and packet losses on the transmission link, which might be present between the individual network elements in the core network (BGF, IM-MGW, MRFP or AS in each case), can be obtained from the data that is transmitted in the RTP data field RTP.

The structure of an "SDP Offer Message" and an "SDP Answer Message" in accordance with the IETF RFC 3264 standard is explained below by way of example, the messages being exchanged e.g. via the SIP signaling protocol SIP between e.g. two network elements or node elements of the IMS core network IMS and containing the expansions.

The AS unit AS, the BGF unit BGF, the ABG unit ABG, the PSTN-G unit PSTN-G or an MRF unit MRF, for example, can be provided as node elements. The structure of a multiplexed data packet DP as illustrated in FIG. 3 is used by way of example.

Unlike the previously described structure of the IPBCP messages, the message exchange that is illustrated below additionally serves to allocate the encoding methods that are used for the transmission, and can relate to a plurality of payload data connections.

SDP Offer Message (Node A->Node B):
O1 c=IN IP4 host.anywhere.com
O2 m=audio 49170 RTP/AVP 98 3 96 97
O3 a=rtpmap:98 VND.3GPP.IUFP/16000
O4 a=fmtp:98 multiplex
O5 a=rtpmap:97 AMR
O6 a=fmtp:97 mode-set=0,2,5,7; mode-change-period=2
O7 a=rtpmap:96 telephone-event
SDP Answer Message (Node B->Node A):
A1 c=IN IP4 host.example.com
A2 m=audio 49320 RTP/AVP 98
A3 a=rtpmap:98 VND.3GPP.IUFP/16000
A4 a=fmtp:98 multiplex; rtp_payload_types=96,97; user_connection_id=11; rtcp_connection_id=12;
A5 a=rtpmap:97 AMR
A6 a=fmtp:97 mode-set=0,2,5,7; mode-change-period=2
A7 a=rtpmap:96 telephone-event In this context, the "SDP Offer Message" is transmitted from the first network node Node A to the second network node Node B. Different encoding methods, specifically "GSM-FR", "AMR" and "Telephone event", are specified in the second line O2 of the SDP Offer Message, for example. These encoding methods are entered using the RTP parameter "payload types" by allocating the values "3", "96" and "97" in the second line O2 of the SDP Offer Message. These are described further by additional parameters which are provided in the fifth, sixth and seventh lines O5, O6 and O7 in accordance with the standardized SDP protocol. The value "98", which specifies the multiplexed IuFP protocol and is described in greater detail by the further parameters provided in the third and fourth line O3, O4, is additionally assigned in the second line O2 as the RTP Payload Type.

Using the parameter "multiplex" for the MIME Type of the IuFP protocol, the parameter being specified in the fourth line O4, the first network node Node A which generates the SDP Offer Message tells the second network node Node B that it wants the payload data connection(s) that are described in the second line O2 to be allocated to a multiplexed connection.

In the first line O1 of the SDP Offer Message, the first network node Node A indicates the IP address it has been allocated, e.g. "host.anywhere.com", to which the multiplexed connection mv is to be routed.

In the second line O2 of the SDP Offer Message, the first network node Node A specifies a free port number it has been allocated, e.g. "49170", which can be used for establishing a new multiplexed connection. If no "multiplex" parameter is contained in the SDP Offer Message, the specified IP address and port number are intended to be used—in a similar manner to the method described above—for establishing a simple non-multiplexed payload data connection. If there is no provision for the IuFP protocol to support a multiplexed transmission and/or the RTP Payload Type in the second network node Node B, the IP address and port number can likewise be used for establishing a simple non-multiplexed payload data connection to the first network node Node A.

Following analysis of the SDP Offer Message, the second network node Node B selects a multiplexed connection to the IP address "host.anywhere.com", e.g. the multiplexed connection having the port number "49320" in the second network node Node B.

The second network node Node B also selects from the encoding methods which are indicated by the SDP Offer Message, e.g. "AMR" and "Telephone event" (RTP Payload Types 96 and 97). In addition, the second network node Node B assigns a first identification code, e.g. "11", to the payload data connection and a further identification code to the allocated RTCP connection, e.g. "12", for the purpose of identifying the payload data connections.

In the event that a multiplexed connection to the specified IP address "host.anywhere.com" does not yet exist, this is established by the SDP Answer Message to the second network node Node B, and specifically to the IP address "host.anywhere.com" and to the port number "49170" in the first network node Node A. In this case, the port having the number "49320" is a port which was previously unused by the second network node Node B. If an existing multiplexed connection mv is selected, the port number "49320" specifies the port number which has been allocated to the multiplexed connection mv in the second network node Node B, and the port number "49170" specifies the port number which has already been allocated to this multiplexed connection in the first network node Node A.

The second network node Node B generates an SDP Answer Message and transmits this to the first network node Node A, wherein the message contains the following information.

The selected RTP Payload Type for the IuFP protocol, specifically e.g. "98", is specified in the second line A2 of the SDP Answer Message, and the parameter "multiplex" for the MIME Type of the IuFP protocol is specified in the fourth line A4, thereby notifying the first network node Node A that the payload data connection described in the SDP media line A2 is allocated to a multiplexed connection mv.

By the parameter "rtp_payload_types" which is specified in the fourth line A4 for the MIME Type of the IuFP protocol, the second network node Node B notifies the first network node Node A of the RTP Payload Types selected for this payload data connection, e.g. "96" for the AMR encoding method and 97 for the "Telephone event" encoding method. The cited RTP Payload Types are defined in greater detail in the fifth to seventh lines O5 to O7.

The parameter "user_connection_id" is inserted in the fourth line A4 for the MIME Type of the IuFP protocol, and notifies the first network node Node A that the payload data connection described in the second line A2 has been assigned the first identification code, e.g. "11". By the parameter "rtcp_connection_id" which is specified in the fourth line A4 for the MIME Type of the IuFP protocol, the first network node Node A is notified that the RTCP connection which is allocated to the payload data connection described in the second line A2 is assigned the second identification code, e.g. "12".

The IP address e.g. "host.example.com" which is allocated to the second network node Node B and via which the multiplexed connection mv travels is allocated in the first line A1, and the port number e.g. "49170" at which the data packets DP that are transmitted via the multiplexed connection are received is specified in the second line A2.

The second network node Node B can instruct the first network node Node A to establish a new multiplexed connection by using a previously unoccupied port number. If the "multiplex" parameter is not contained in the SDP Answer Message, the transmitted IP address and port number can be used for establishing a simple non-multiplexed payload data connection.

As shown in FIG. 4, the first and second network nodes Node A, Node B can in each case comprise a control unit which is responsible for the SIP signaling, e.g. the P-CSCF, IBCF, MGCF or MRFC unit P-CSCF, IBCF, MGCF, MRFC, and a processor unit which is responsible for the payload data connections, e.g. the BGF, IM-MGW or MRFP unit BGF, IM-MGW, MRFR. Processor unit and control unit communicate with each other in accordance with e.g. the ITU-T H.248 standard in each case. In a preferred embodiment, the processor unit is responsible for the management of the multiplexed connections mv and for the assignment of the address information relating to the payload data connections.

Before the transmission of the SDP Offer Message, the control unit and the processor unit of the respective network node Node A, Node B exchange messages in accordance with the existing standard. In particular, the processor unit notifies the control unit of its IP address "host.anywhere.com" and the port number it has been assigned, e.g. "49170". The signaling is additionally expanded to the effect that the processor unit notifies the control unit that it desires the use of a multiplexed connection. For this purpose, for example, the RTP payload in the IuFP protocol as per the second to fourth lines O2 to O4 can be transmitted from the processor unit to the control unit using a selected H.248 message.

Between receiving the SDP Offer Message and sending the SDP Answer Message, messages are exchanged between the control unit and the processor unit of the relevant network node Node A, Node B in accordance with the existing standard. As part of this activity, the processor unit already indicates e.g. the IP address and the port number which are received in the SDP Offer Message. In a preferred embodiment, the control unit also signals to the processor unit that multiplexing is desired. This is done e.g. by forwarding the RTP Payload for the IuFP protocol in accordance with the second to fourth lines O2 to O4 by a suitable H.248 message.

The processor unit then selects the multiplexed connection and assigns the relevant identification codes to the payload data connections. The processor unit already notifies the control unit of its IP address and the port number it has been assigned.

If an SPDF is located between control unit and processor unit, this forwards the described information in each case.

The subject matter has been described in the foregoing with reference to an exemplary embodiment. It is obvious that numerous changes and modifications are possible without thereby departing from the fundamental inventive idea of the invention.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for allocating at least one payload data connection to at least one multiplex connection which is provided between a first network element and a second network element, comprising:
    generating and transmitting a first signaling message by the first network element to the second network element;
    indicating the readiness of the first network element to transport the at least one payload data connection via a multiplexed connection in each case to the second network element by the first signaling message; and
    allocating each of the at least one payload data connection in each case to a multiplexed connection between the first network element and the second network element or selecting a transport outside of a multiplexed connection for this payload data connection, depending on the indicated readiness of the first network element and on whether the transport of the at least one payload data connection via the multiplexed connection is supported by the second network element, the second network element,
    wherein a second signaling message which is generated in the second network element and transmitted to the first network element, the possible allocation of the at least one payload data connection to a multiplexed connection is indicated to the first network element.

2. The method as claimed in claim 1, wherein
the readiness of the first network element to transport the at least one payload data connection via a multiplexed connection is indicated by a multiplexing identification code in the first signaling message.

3. The method as claimed in claim 1, wherein
address information which has been allocated to the first network element is transmitted in the first signaling message.

4. The method as claimed in claim 1, wherein
the second network element (MSC-B) selects the allocated multiplexed connection with the aid of the address information which is contained in the first signaling message.

5. The method as claimed in claim 1, wherein
if a plurality of multiplexed connections are available between the first network element and the second network element, the second network element allocates one of these multiplexed connections which has sufficient free transmission resources for the transport of the payload data connection.

6. The method as claimed in claim 1, wherein
the multiplexed connection is set up automatically and dynamically.

7. The method as claimed in claim 1, wherein
dynamic establishment of these multiplexed connections is triggered by the second network element allocating a multiplexed connection.

8. The method as claimed in claim 7, wherein
the dynamically established multiplexed connection for receiving data on the first network element side is assigned a User Datagram Protocol (UDP) port number which is contained in the first signaling message, and that a previously assigned UDP port number remains assigned to an already existing multiplexed connection.

9. The method as claimed in claim 1, wherein
allocation of the at least one payload data connection to a multiplexed connection is indicated to the first network element by means of a multiplexing identification code which is provided in the second signaling message.

10. The method as claimed in claim 9, wherein
if the second Mobile Switching Center does not support the establishment of the payload data connection via the multiplexed connection, a simple data connection between the specified IP addresses and port numbers is established.

11. The method as claimed in claim 1, wherein
allocated multiplexed connection is preferably indicated in the second signaling message by means of a User Datagram Protocol port number.

12. The method as claimed in claim 1, wherein the second network element allocates an identification code to the payload data connection which is allocated to the multiplexed connection.

13. The method as claimed in claim 12, wherein the identification code is indicated to the first network element in the second signaling message.

14. The method as claimed in claim 12, wherein the identification code in each case is transmitted in a data field of a data packet of the multiplexed connection.

15. The method as claimed in claim 12, wherein a "Session Description Protocol" attribute or a "Multimedia Internet Message Extension" parameter as per the standard TS 29.414 is transmitted as a multiplexing identification code.

16. The method as claimed in claim 1, wherein for the purpose of establishing a payload data connection in a mobile radio system, an IPBCP Request Message and an IPBCP Response Message are exchanged between the network elements, these being designed in each case as Mobile Switching Centers and being connected together via a BICC signaling connection.

17. The method as claimed in one of the claims 1, wherein for the purpose of establishing a payload data connection in an IMS-based communication system, an Session Description Protocol (SDP) Offer Message and an SDP Answer Message are exchanged between the network elements, these being connected together via a SIP signaling connection.

18. The method as claimed in claim 17, wherein a Session Description Protocol attribute or a Multimedia Internet Message Extension parameter as per the standard TS 29.414 is transmitted as a multiplexing identification code.

19. The method as claimed in one of the claims 1, wherein the multiplexed connection is terminated by the first and second network elements in each case.

* * * * *

UNITED STATES PATENT AND TRADEMARK OFFICE
CERTIFICATE OF CORRECTION

PATENT NO. : 8,089,867 B2
APPLICATION NO. : 12/162281
DATED : January 3, 2012
INVENTOR(S) : Thomas Belling Page 1 of 1

It is certified that error appears in the above-identified patent and that said Letters Patent is hereby corrected as shown below:

Title Page, Column 2 (Other Publications), Line 2-4, Delete "BICC IP Bearer Control Protocol", International Telecommunication Union, ITU-T Recommendation Q.1970, Jul. 2001 (whole document)." and insert the same on Title Page, under "Other Publications", on Line 3, as a new Entry.

Column 14, Line 29, In Claim 4, after "element" delete "(MSC-B)".

Column 16, Line 4, In Claim 17, delete "one of the claims 1," and insert -- claim 1, --, therefor.

Column 16, Line 16, In Claim 19, delete "one of the claims 1," and insert -- claim 1, --, therefor.

Signed and Sealed this
Twenty-fourth Day of April, 2012

David J. Kappos
*Director of the United States Patent and Trademark Office*